United States Patent [19]

Molnar

[11] 4,386,799

[45] Jun. 7, 1983

[54] SHOCK ABSORBING DEVICE HAVING PREDICTABLE DEFLECTION CHARACTERISTICS

[75] Inventor: Arpad A. Molnar, Boulder, Colo.

[73] Assignee: Molnar Industries, Inc., Boulder, Colo.

[21] Appl. No.: 234,330

[22] Filed: Mar. 13, 1981

Related U.S. Application Data

[63] Continuation-in-part of Ser. No. 228,257, Jan. 26, 1981, abandoned.

[51] Int. Cl.³ ........................ B60R 21/14; B60R 19/00
[52] U.S. Cl. .................................................. 293/120
[58] Field of Search ........................ 293/122, 123, 120

[56] References Cited

U.S. PATENT DOCUMENTS

| | | | |
|---|---|---|---|
| 2,531,967 | 11/1950 | Bishop | 293/120 |
| 2,873,993 | 2/1959 | Savke | 293/120 |
| 4,061,385 | 12/1977 | Schwartzberg | 293/120 |
| 4,066,285 | 1/1978 | Hall et al. | 293/120 |
| 4,320,913 | 3/1982 | Kuroda | 293/120 |
| 4,333,674 | 6/1982 | Buettner et al. | 293/120 |

Primary Examiner—Richard A. Bertsch
Attorney, Agent, or Firm—Gary M. Polumbus

[57] ABSTRACT

A lightweight shock absorbing device which could be used on automotive vehicles includes an elongated main body portion and side return portions connectable to opposite ends of the main body for extension a short distance along the side of the vehicle. The main body portion includes longitudinally extending corrugations which open both forwardly and rearwardly, forming locking channels into which accessories, stiffeners and mounting brackets can be selectively connected to the body. Reinforcement stiffeners can be attached to the body at any desired location along the length of the body to establish desired shock absorbing characteristics dependent upon the weight and size of the vehicle on which the bumper is mounted.

18 Claims, 10 Drawing Figures

SHOCK ABSORBING DEVICE HAVING PREDICTABLE DEFLECTION CHARACTERISTICS

REFERENCE TO PRIOR APPLICATIONS

This application is a continuation-in-part of my prior application, identified by Ser. No. 228,257 in the United States Patent and Trademark Office, which application was filed on Jan. 26, 1981, but which is now abandoned.

BACKGROUND OF THE INVENTION

The present invention relates generally to shock absorbing devices, such as, by way of example, a shock absorbing bumper for an automotive vehicle.

While bumpers of some early automobiles were mounted with shock absorbing springs to cushion the impact of the auto with foreign bodies or objects, for many years, most automobiles had no means for absorbing shock applied to the automobile upon impact with a foreign body. Bumpers, for many years, were made of chrome plated steel mostly for aesthetic purposes while giving only limited protection to the automobile.

In recent years, with the increased concern in passenger safety, many automobile bumpers have included shock absorbing cylinders, rubber coatings and the like, to give the bumper the capability of absorbing forces applied to the vehicle. These bumper designs, however, have necessitated the addition of weight in the form of shock absorbing cylinders or the like, and, thus, are not consistent with a recent trend in improving automotive operating economy by reducing the weight of the vehicle.

Improved shock protection is desirable beyond the automotive industry. Anywhere machinery or objects are moved about, impacts can occur, and preventing damage to property and people by absorbing impacts is important.

It is, accordingly, a primary object of the present invention to provide a new and improved bumper or shock absorbing device which has desirable shock absorbing characteristics and is relatively light weight in comparison to prior art bumpers.

It is a related object of the present invention to provide a bumper for automotive vehicles which has desirable shock absorbing characteristics and is relatively light weight in comparison to prior art bumpers.

It is another object of the present invention to provide a simplified bumper that is economical to manufacture, and affords not only desirable shock absorbing qualities, but, also, is relatively light in weight.

It is another object of the present invention to provide a bumper for an automotive vehicle which includes means for mounting accessories on the bumper, including mounting brackets, without drilling holes in the bumper or otherwise weakening the structural integrity of the bumper.

It is still another object of the present invention to provide an automotive vehicle bumper having a high strength to weight ratio and superior recovery characteristics after impact.

In accordance with the foregoing objects, a shock absorbing device made in accordance with the present invention, which, for purposes of the present disclosure, will be described as an automotive bumper, includes an elongated main body portion mounted on an automobile or other object at two spaced locations. The main body portion includes longitudinally extending corrugations lending strength to the body while defining means for attaching various accessories to the bumper without drilling holes in the bumper or otherwise impairing its structural integrity. The longitudinally extending corrugations define channels having an interior or head portion of a larger cross-sectional size than a neck portion which forms the opening into the larger head portion. In this manner, connecting members can be inserted into the channels and retained therein by the self-locking configuration of the channel to establish a foundation to which various accessories can be connected to the main bumper body. The accessories might include mounting brackets which are connectable to the vehicle to interconnect the bumper with the vehicle, stiffening members lending additional strength to the bumper at preselected locations along its length, license plate mounting bars and most any other accessory which is attachable to a bumper.

In the preferred embodiment of the invention, forwardly opening channels in the main bumper body receive resilient bumper strips for absorbing minor impacts and also receive connectors for mounting a license plate, while a rearwardly opening channel or channels receive connectors for attaching stiffening members, mounting brackets and the like.

The bumper further includes a pair of end caps mounted directly on the ends of the main body portion to form a rearward return at both ends of the bumper for a short extension along opposite sides of the vehicle.

The stiffening member can take various forms and can be placed at various locations along the length of the main bumper body. The form and position of the stiffening members is normally determined by the requirements of a given automobile, which requirements are normally dictated by the size and weight of the vehicle and the shock absorbing strength desired from the bumper.

Other objects, advantages and capabilities of the present invention will become more apparent as the description proceeds when taken in conjunction with the accompanying drawings.

BRIEF DESCRIPTION OF THE DRAWINGS

FIG. 8 is a transverse section taken through the main body portion of the bumper illustrating a second embodiment of a stiffener utilized with the bumper.

DESCRIPTION OF THE PREFERRED EMBODIMENTS

Figure 1:
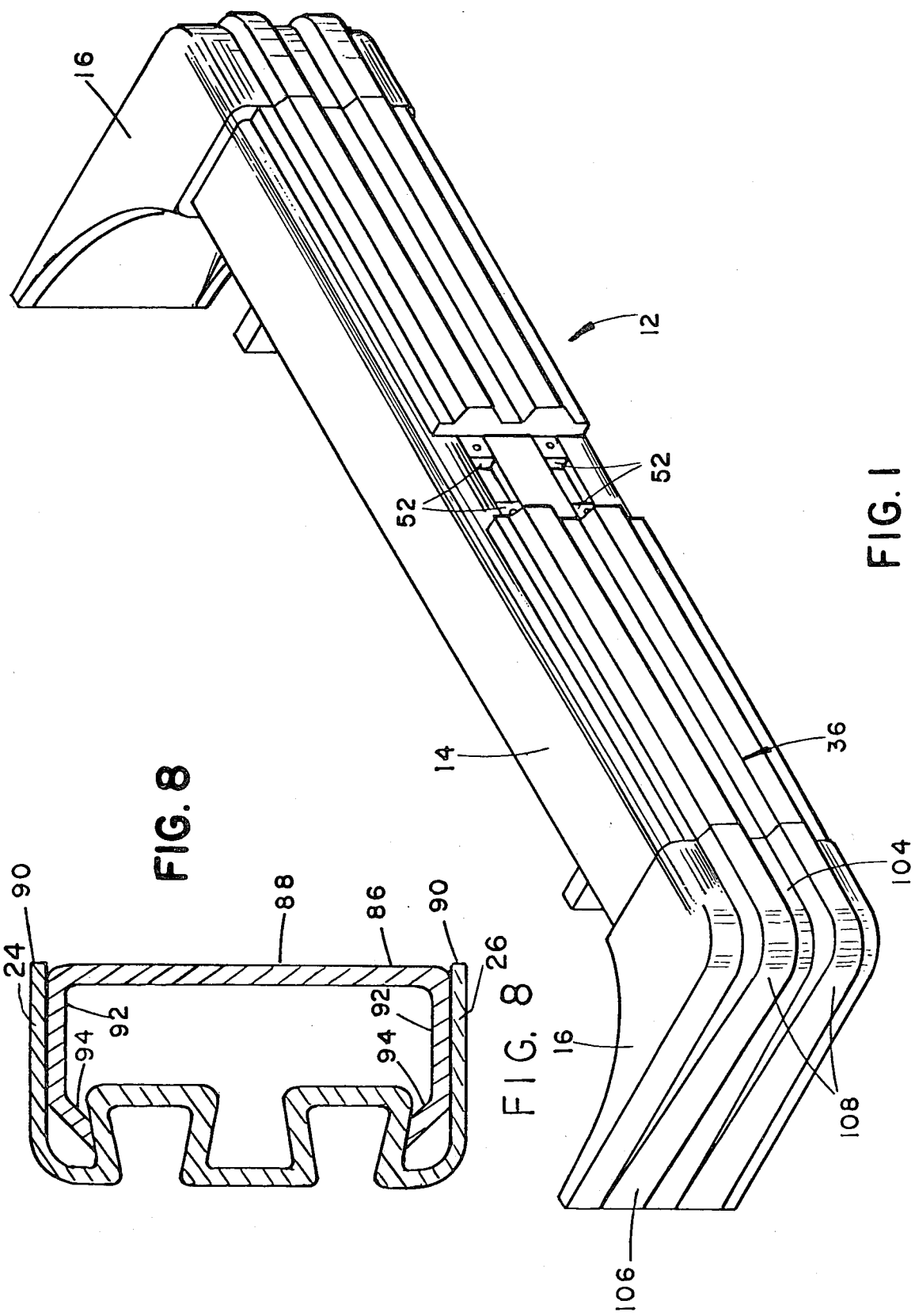
FIG. 1 is a perspective view of the bumper of the present invention.
Figure 6:
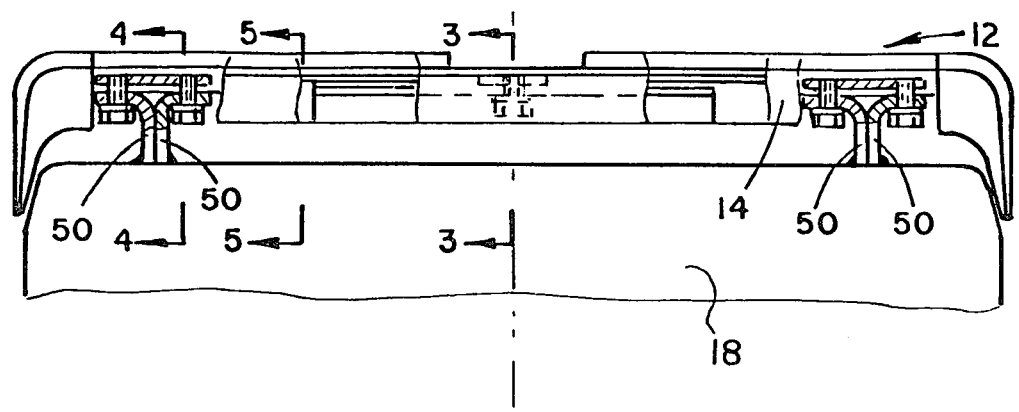
FIG. 6 is a fragmentary top elevation of the bumper mounted on a vehicle, with parts of the bumper broken away to show component parts thereof.

Referring first to FIGS. 1 and 6, the bumper 12 of the present invention can be seen to include an elongated main body portion 14 and a pair of end caps 16 attached to opposite ends 17 of the main body to form rearwardly projecting extensions along the sides of a vehicle 18 on which the bumper is mounted. Though the bumper 12 will be hereinafter described in the automotive environment, it will be understood that the bumper may be attached to many other movable or stationary objects that may inflict damage or be damaged by impact with other objects.

Figure 2:
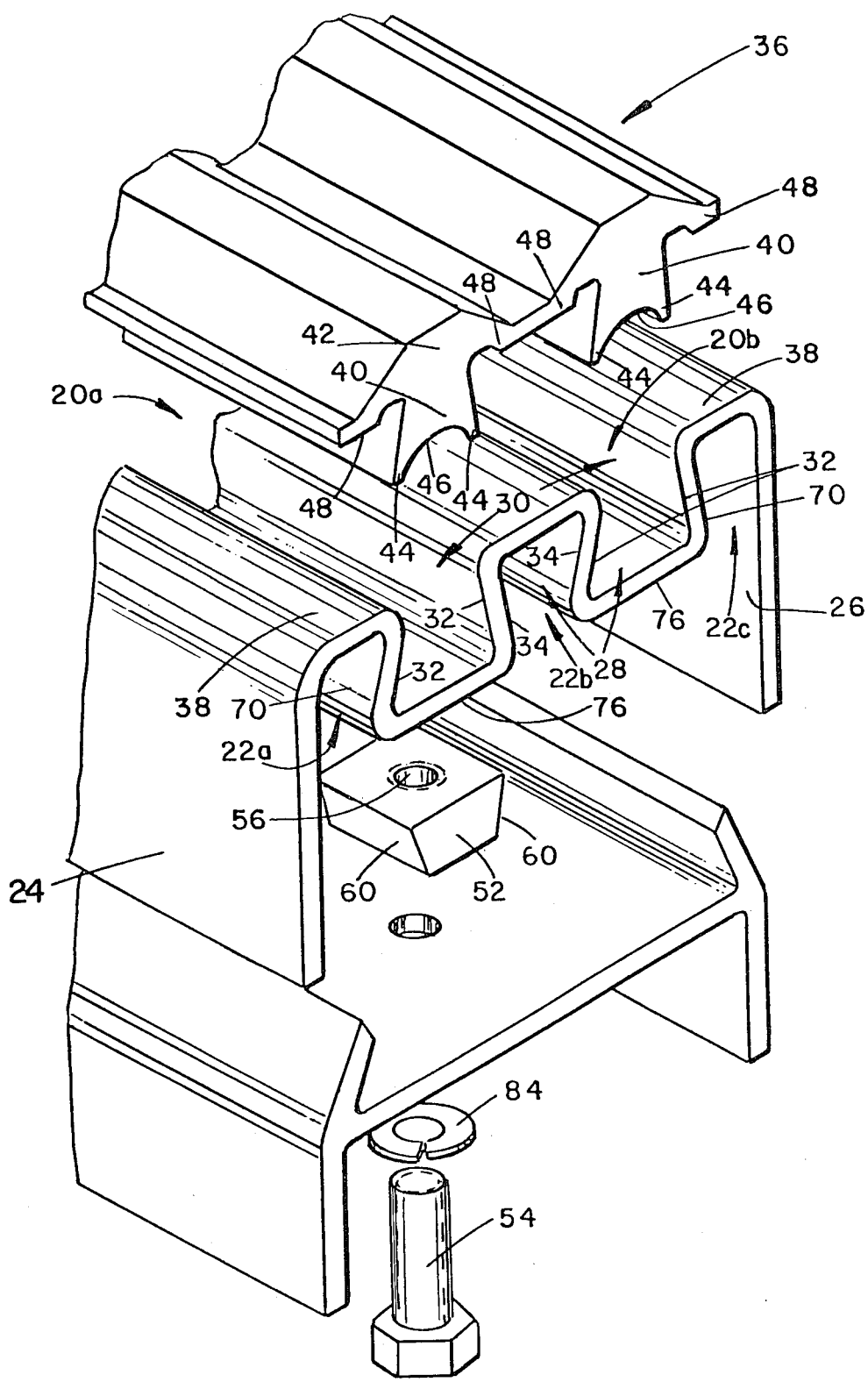
FIG. 2 is an exploded fragmentary perspective view of the main body portion of the bumper shown in FIG. 1.
Figure 3:
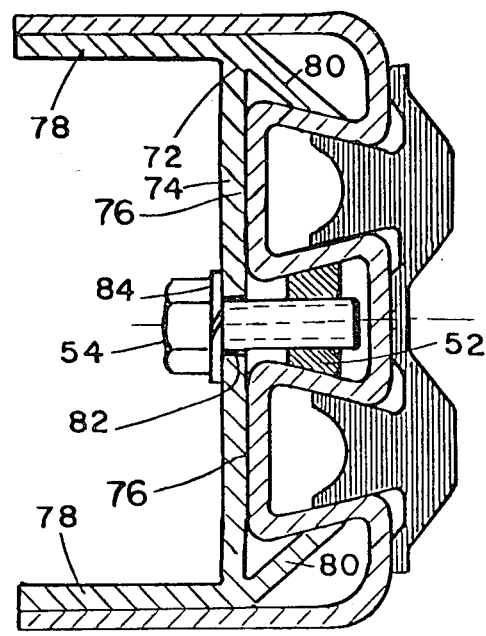
FIG. 3 is a section taken along line 3—3 of FIG. 6.

The main body portion 14 of the bumper 12 is probably best described by reference to FIGS. 1, 2 and 3, wherein it can be seen that the main body portion consists of an elongated sheet of material which has been longitudinally corrugated to define two forwardly opening channels 20a and 20b, three rearwardly opening channels 22a, 22b and 22c, and upper and lower flanges 24 and 26, respectively, projecting in a rearward direction. While the bumper could be made of various materials, it has been found that a resin reinforced with fibers, such as glass or graphite fibers, gives desired results. Further, by using fiber reinforced resin, existing equipment can be used to form the bumper body utilizing conventional methods and also gives the freedom of varying the wall thickness of the body, the specific reinforcement to resin ration, and the orientation of the reinforcement to fit the parameters of a given application for the bumper. Further, the bumper could be coated with a polyurethane material to make it abrasive resistant or coated with chrome for aesthetic purposes.

Both the forwardly opening channels 20a and 20b in the main bumper body 14 and the central rearwardly opening channel 22b are formed to have a trapezoidal transverse cross section so that each channel has a head portion 28 forming the interior of the channel and a neck portion 30 defined by the relatively narrow longitudinal entry into the channel. The two rearwardly opening channels 22a and 22c adjacent the top and bottom, respectively, of the main bumper body can be seen to be approximately half the size of the central rearwardly opening channel 22b and have a transverse cross-sectional configuration similar to one symmetrical half of the central rearwardly opening channel 22b. As will be appreciated, the channels defined by the angular walls of the sheet, from which the main body is made, give structural strength to the main body portion and also establish means by which accessories, such as mounting brackets and the like, can be connected to the main body portion in a manner to be described hereinafter. In this connection, it is important to note that each of the forwardly opening channels has rearwardly convergent side walls 34.

Figure 5:
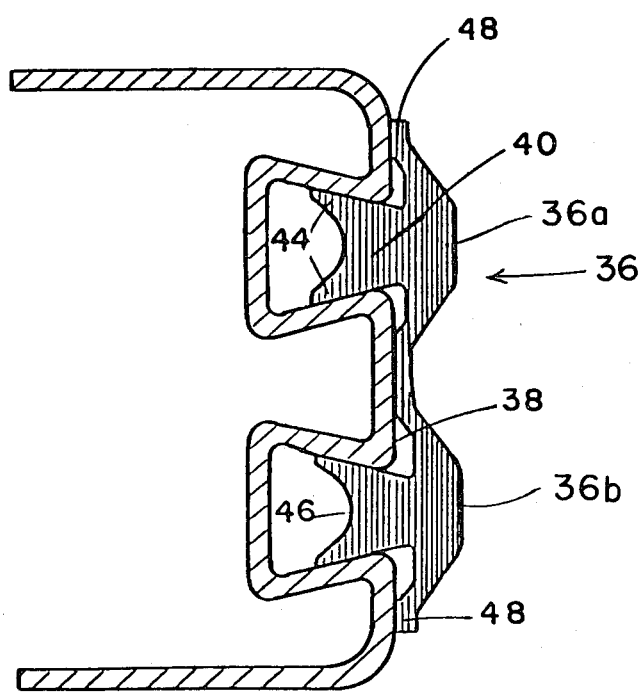
FIG. 5 is a section taken along line 5—5 of FIG. 6.

Referring to FIG. 5, an accessory in the form of a resilient impact strip 36 is shown connected to the main bumper body 14 so as to form a forward extension from the front face 38 of the bumper body. The impact strip is seen to comprise two identical integrally connected sections 36a and 36b which, in transverse cross section, are generally T-shaped, having a leg portion 40 of the T adapted to extend into one of the forwardly opening channels 20a and 20B in the main bumper body and a cross portion 42 of the T extending across the open neck 30 of the channel. The leg portion 40 of each impact strip section has two rearwardly directed arms 44 formed between a generally semi-circular groove 46 in the rear face of the leg portion, and these arms are flared outwardly in a rearward direction so as to conform with and abut against the forwardly convergent side walls 32 of the channel into which the T-shaped section is inserted. The cross portion 42 of each T-shaped section is of generally trapezoidal cross section, having arms 48 at either side which abut the front face 38 of the main bumper body to positively hold the impact strip in a predetermined position on the main bumper body. The impact strip can be slid into the forwardly opening channels 20a and 20b from either end of the main bumper body where the channels are open, so that the leg portion 40 of each T-shaped section is positively retained in the associated forwardly opening channel and the arms 44 on the cross portion of the T-shaped section are abutted against the front face 38 of the main bumper body. As will be appreciated, two identical impact strips could be utilized, with each being of T-shaped cross section and fitting in one of the forwardly opening channels 20a and 20b, but, in the preferred embodiment, the T-shaped sections are interconnected along their adjacent sides to form a one-piece strip. Preferably, the impact strip 36 is made of a rubber-like material so as to absorb minor impacts. Not only does the inherent nature of the rubber material absorb such minor impacts, but, as will be appreciated, a space exists between the trapezoidal cross portion 42 of a T-shaped section and the front face 38 of the bumper body so that mirror rearward movement is allowed, which also serves to cushion impacts to the bumper.

The impact strip is interrupted at its longitudinal center to provide a space wherein a license plate could be mounted in a manner which will be described later.

As mentioned previously, the main bumper body 14 is designed so that the open channels assist in connecting mounting brackets and accessories to the main bumper body. As will be appreciated with the following description, these accessories are mounted to the main bumper body in a way which will not detract from the structural integrity or strength of the bumper body 14.

Figure 4:
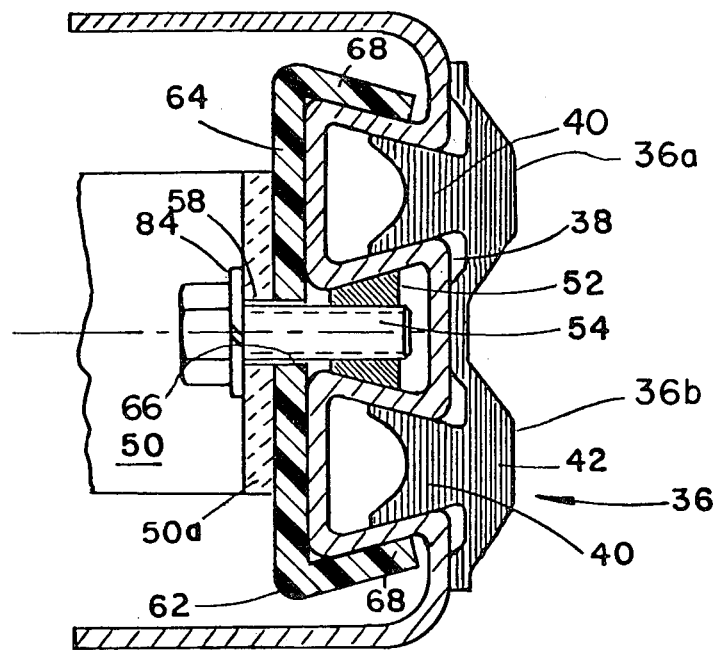
FIG. 4 is a section taken along line 4—4 of FIG. 6.

Referring to FIGS. 4 and 6, it will be appreciated that the bumper 12 is connected to an automobile or other automotive vehicle at the ends 17 by pairs of generally L-shaped bumper brackets 50 which protrude forwardly from the front end of the vehicle 18. The pairs of brackets 50 are disposed so that they are in back to back relationship and have front portions 50a that turn outwardly in opposite lateral directions at a predetermined distance from the front of the vehicle. In the disclosed embodiment of the invention, there are two pair of the mounting brackets, with one pair being disposed near each side of the vehicle.

The brackets 50 are attached to the vehicle 18 in a conventional manner and to the main bumper body 14 by special connector bars 52 and conventional fasteners 54. The connector bars 52 are in the form of a short bar of material of trapezoidal transverse cross section adapted to be slid into the head portion 28 of the rearwardly opening central channel 22b from an open end of the channel and abut against the rearwardly convergent sides 34 of that channel. The bar 52 has an internally threaded opening 56 through the center thereof adapted to receive the fastener 54, which may be in the form of a bolt having threads adapted to mate with the internal threads in the connector. In this manner, the bolt can be passed through an opening 58 in the leading portion 50a of each mounting bracket 50 and be threaded into the connector bar to positively secure the mounting bracket to the bumper body. The rearwardly convergent faces 60 of the connector bar and the rearwardly convergent sides 34 of the channel 22b, when in abutting relationship, prevent the connector from passing rearwardly through the neck portion 30 of the channel to provide a positive connection between the brackets and the main bumper body.

Connector bars 52 are also centrally positioned in the forwardly opening channels 20a and 20b in the space between the impact strips to mount a license plate by extending fasteners 54 through the openings normally found in license plates and threadably connecting the fasteners to the connector bars 52.

As mentioned previously, the bumper body 14 can be reinforced at any location along its length by stiffening means connected to the bumper body. The stiffening means are connected to the body to not only minimize deflection of the body in a rearward direction, but, also, to reinforce the body, if desired, at locations such as at the location of an attachment of a mounting bracket 50 to the bumper body.

As seen in FIG. 4, a stiffening member 62, which could be of any preselected length, is shown positioned between the main bumper body 14 and the mounting bracket 50, forming a broad, flat surface against which the mounting bracket is abutted. The stiffening member 62 illustrated in FIG. 4 can be seen to be of generally U-shaped transverse cross section, with a base plate 64 having an opening 66 therethrough to receive the fastener 54 and forwardly convergent legs 68 adapted to abut against the rearwardly divergent sides 70 of the rearwardly opening channels 22a and 22c at the top and bottom of the main bumper body. It will, therefore, be appreciated that the stiffening member 62 could be attached to the main bumper body in a self-locking manner without the use of other attachment means, but, in the preferred form, is further secured by the fastener 54 and connecting bar 52.

As mentioned previously, the stiffeners, attached to the main bumper body 14, can be positioned at any location, can take any one of numerous configurations, and can serve various functions. By reference to FIG. 3, which is a cross section taken in a plane containing a longitudinal center line 71 and perpendicular to the main bumper body, it can be seen that a stiffener 72 takes the general form of an H in cross section, having a base portion 74 extending vertically in abutting relationship with the rear face 76 of the main bumper body, rearwardly directed parallel upper and lower legs 78 fitting flush against the inner surfaces of the top and bottom flanges 24 and 26, respectively, of the main bumper body, and a pair of forwardly convergent legs 80 abutting against and gripping the rearwardly divergent sides 70 of the rearwardly opening channels 22a and 22c at the top and bottom of the bumper body.

The stiffener 72 could extend for any selected distance along the center of the bumper to minimize deflection of the bumper and is connected to the bumper in the same manner in which the previously described stiffener is connected, i.e., through use of a connector bar 52 and fastener 54 adapted to extend through an opening 82 provided in the base portion 74 of the stiffener. This connection is more clearly illustrated in the exploded view of FIG. 2, wherein it will also be appreciated that a lock washer 84 is utilized to retain a tight interconnection between the various parts, such a lock washer preferably being used at all fastener-connector locations.

An alternative form of a stiffener 86 which could be utilized along the central portion of the main bumper body 14 in place of the stiffener 72 to give more resistance to deflection is illustrated in FIG. 8 and can be seen to be of generally trough shaped cross-sectional configuration. In this embodiment of the stiffener, a base plate portion 88 extends parallel to the rear face 76 of the bumper body, but at a rearwardly spaced distance therefrom, in substantial alignment with the trailing edges 90 of the upper and lower flanges 24 and 26 of the main bumper body. A pair of forwardly projecting sides 92 of the stiffener are adapted to be contiguous with the top and bottom flanges 24 and 26 along the internal surfaces thereof, and forwardly convergent legs 94, forming a forward extension from the sides 92, are adapted to project against and grip the rearwardly divergent sides 70 of the rearwardly opening channels 22a and 22c at the top and bottom of the main bumper body so as to hold the stiffener 86 in place relative to the main bumper body. Of course, a bolt and connector type fastening system could also be utilized with this stiffener, even though it is not illustrated in FIG. 8.

Figure 7:
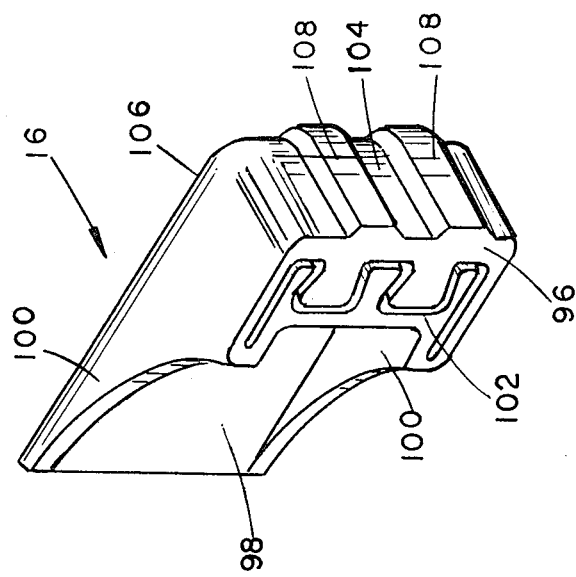
FIG. 7 is a perspective view of the end cap portion of the bumper of FIG. 1.

The end caps 16 for the main bumper body 14 which, as mentioned previously, form rearward extensions along the sides of the vehicle 18, are shown in both FIGS. 1 and 7. Referring to FIG. 7, the end caps can be seen to have a relatively thick forward body section 96 and a hollow rearward extension section 98, with parallel arcuate flanges 100 along the top and bottom of the rearward extension 98. A slot 102 is formed in the relatively thick forward body section 96 having a configuration and size identical to the cross-sectional configuration and size of the main bumper body 14. In this manner, each end of the main bumper body 14 can be inserted into the slot 102 formed in the end cap 16, after the connector bars and impact strip have been slid into the open channels, so as to be frictionally retained therein, or bonded, if additional adhesion is desired. It will also be appreciated that the external front and side surfaces 104 and 106, respectively, of each end cap are formed with a pair of elongated protrusions 108 which substantially conform in cross-sectional size and configuration to the impact strip 36 mounted on the front face of the main bumper body so as to form a visual extension thereof.

Figure 9:
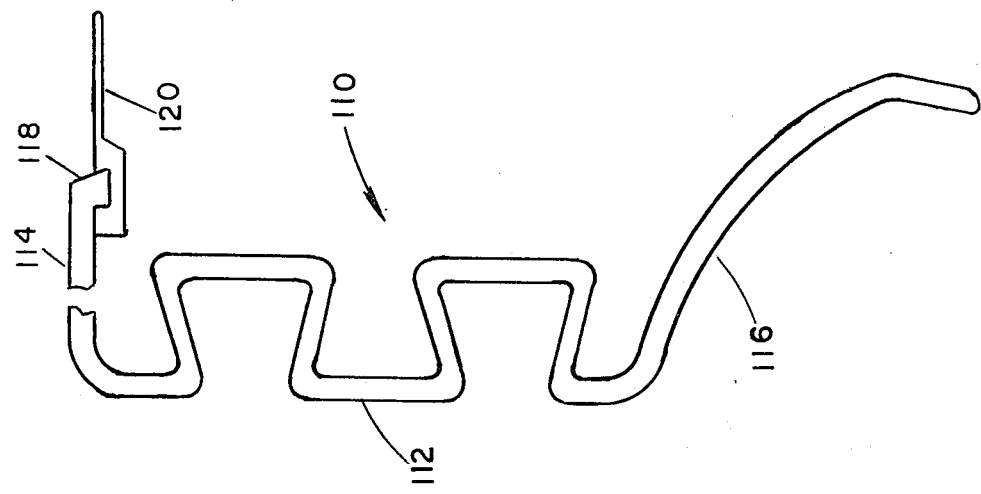
FIG. 9 is a transverse section taken through an alternative embodiment of the main body portion of the bumper.

Referring to FIG. 9, an alternative embodiment 110 of the main bumper body 14 is shown in cross section and has an intermediate body portion 112, which is substantially identical to the previously described embodiment of the main bumper, but the upper and lower flanges 114 and 116, respectively, of the main bumper body, in this embodiment, have been modified to define an air foil for the bottom flange 116 and means, in the form of a lock bead 118, on the trailing end of the upper flange 114, which is adapted to receive and support a gravel shield 120, such as found on some vehicles, to prevent gravel from passing between the bumper and the vehicle.

The bumper 12 of the present invention has been found to provide excellent shock absorbing capabilities, while having resilient properties, so as to return to its original form even after severe impact by outside forces. In fact, a bumper, formed in accordance with the present invention, has been found to react predictably in accordance with the following equation when (a) the bumper is supported at the two spaced locations 17 (FIG. 10), which are equidistant from the longitudinal center 71 of the bumper, (b) a stiffener 72, having the same elastic modulus as the main bumper body 14, is affixed to the main bumper body at its longitudinal center so as to extend equal distances in opposite directions along the length of the bumper from the center line 71, and (c) equal forces $F_1$ are applied to the bumper body in a rearward direction at two locations defined by the ends of the stiffener creating equal and opposite reactionary forces $F_2$ at the two support locations 17:

$$W_2 (Max) = \frac{F}{E} \left[ \frac{1}{I_2} \left( \frac{L_2^3}{3} \right) + \frac{L_1 L_2}{2I_1} (2L_2 + L_1) \right]$$

wherein,

F = magnitude of each of the four equal forces $F_1$ and $F_2$ applied to the body.

E = elastic modulus of the material from which the body and stiffener are made.

$I_1$ = moment of inertia of the transverse cross-sectional area of the bumper and stiffener with respect to an axis 77, passing through the centroid 79 of the bumper and being perpendicular to the length of the bumper and the direction of the forces $F_1$ and $F_2$.

$I_2$ = moment of inertia of the transverse cross-sectional area of the bumper without the stiffener with respect to the axis 77.

$L_2$ = distance from each end of the stiffener to the nearest support location 17.

$2L_1$ = length of stiffener.

$W_2$ = maximum deflection of the bumper at the longitudinal center 71 of the bumper.

Figure 10:
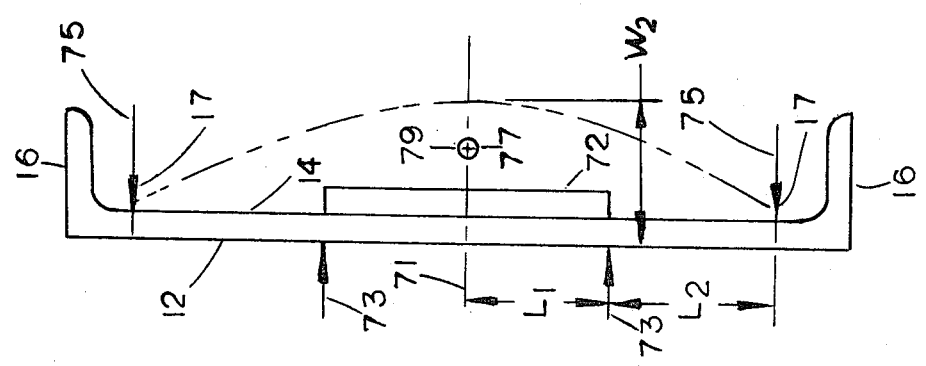
FIG. 10 is a diagrammatic top plan view of the main body portion of the bumper and a stiffener, with an exaggerated diagrammatic representation of a deflection of the bumper and stiffener as a result of external

The application of this formula to the bumper 12 to determine its behavior under various force conditions is best understood by reference to FIG. 10, which shows a diagrammatic illustration of a top plan view of the main bumper body 14 and stiffener 72, and with the centroid 79 of the bumper and stiffener being indicated by a cross in a circle. It will also be appreciated that the transverse cross-sectional area of the bumper body and stiffener is in a plane perpendicular to the length of the bumper. The other elements of the equation are, of course, determined from the material out of which the bumper body 14 and stiffener 72 are made and the physical characteristics of the bumper body and stiffener.

Although the present invention has been described with a certain degree of particularity, it is understood that the present disclosure has been made by way of example, and changes in detail or structure may be made without departing from the spirit of the invention, as defined in the appended claims.

What is claimed is:

1. A shock absorbing device comprising in combination:
an elongated body adapted to be mounted on a supporting object, said body having a front face and a rear face confronting said object, an open groove formed in the rear face, said groove having a neck portion near the rear face and a head portion forwardly of the neck portion, said neck portion being of smaller dimension than said head portion, and attachment means adapted to be secured in said groove, said attachment means including means to facilitate attachment of said device to the supporting object.

2. The invention defined in claim 1 wherein said shock absorbing device is a bumper for an automotive vehicle.

3. The bumper device of claim 2 wherein said attachment means includes an element having a dimension smaller than the head portion of said groove, and a fastener releasably connected to said element and extending through said neck portion of the groove for operative attachment to said vehicle.

4. The bumper device of claim 3 further including stiffening means adapted to be positioned adjacent to said rear face of the elongated body along at least one selected portion thereof, and wherein said attachment means are further adapted to attach the stiffening means to said body.

5. The bumper device of claim 2 further including at least one forwardly opening groove formed in the elongated body extending substantially the entire length thereof, said forwardly opening groove having a neck portion near said front face and a head portion rearwardly of said neck portion, said neck portion of the forwardly opening groove being of smaller dimension than the head portion of the forwardly opening groove.

6. The bumper device of claim 5 wherein said forwardly opening groove is of identical size and configuration to said rearwardly opening groove.

7. The bumper device of claim 5 further including resilient strip means mounted in said forwardly opening groove and protruding forwardly of said front face.

8. The bumper device of claim 5 wherein there are two identical forwardly opening grooves.

9. The bumper device of claim 8 further including stiffening means adapted to be positioned adjacent to said rear face of the elongated body along at least one selected portion thereof and wherein said attachment means is adapted to attach said stiffening means to said body, said attachment means including an element having a dimension smaller than the head portion of said rearwardly opening groove but larger than the neck portion of said rearwardly opening groove, and a fastener connected to said element and extending through said neck portion of the rearwardly opening groove for attachment to said stiffening means.

10. The bumper device of claim 9 wherein said forwardly and rearwardly opening grooves are of trapezoidal transverse cross section.

11. The bumper device of claim 9 wherein said stiffening means comprises an elongated member having portions extending parallel to said rear face.

12. The bumper device of claim 11 wherein said elongated member defines a rearwardly opening channel.

13. The bumper device of claim 11 wherein said elongated member defines a forwardly opening channel which cooperates with said elongated body in forming a hollow tubular passage when said elongated member is attached to said elongated body.

14. The bumper device of claim 13 further including a pair of end caps connected onto opposite ends of said elongated body.

15. The bumper device of claim 13 wherein said elongated body is made of glass fiber reinforced resin.

16. The bumper device of claim 2 further including a pair of end caps connected onto opposite ends of said elongated body.

17. The bumper device of claim 2 wherein said elongated body is made of glass fiber reinforced resin.

18. An elongated shock absorbing device of uniform transverse cross-sectional area having a front face, a centroid, and being adapted to be mounted on an object at two longitudinally spaced support locations, said device having a stiffener with the same elastic modulus as said device being mounted on said device along a portion of the length of said device, said stiffener further being of uniform transverse cross-sectional area and being symmetric with respect to the longitudinal center of said device, the maximum deflection of said bumper being calculated in accordance with the following formula wherein the maximum deflection occurs at the longitudinal center of the device in a rearward direction:

$$W_2 \text{(Max)} = \frac{F}{E}\left[\frac{1}{I_2}\left(\frac{L_2^3}{3}\right) + \frac{L_1 L_2}{2I_1}(2L_2 + L_1)\right],$$

wherein,

F is a force applied to the device in a rearward direction at two locations defined by the ends of the stiffener;

E is the elastic modulus of the material forming the bumper and the stiffener;

$I_1$ is the moment of inertia of the transverse cross-sectional area of the bumper and stiffener about an axis passing through the centroid and being perpendicular to the length of the device and the direction of the forces F applied to the device;

$I_2$ is the moment of inertia of the transverse cross-sectional area of the bumper without the stiffener about said axis;

$L_2$ is the longitudinal distance from each end of the stiffener to the nearest support location of the bumper; and $2L_1$ is the length of the stiffener.

* * * * *